United States Patent [19]

Eggert

[11] 4,319,328

[45] Mar. 9, 1982

[54] POSTAGE COST RECORDING SYSTEM

[75] Inventor: Carl A. Eggert, Northridge, Calif.

[73] Assignee: Sabre Products, Inc., North Hollywood, Calif.

[21] Appl. No.: 125,099

[22] Filed: Feb. 27, 1980

[51] Int. Cl.[3] .............................................. G06F 15/20

[52] U.S. Cl. ........................................ 364/466; 177/3; 177/25; 235/92 WT

[58] Field of Search ............... 364/464, 466, 567, 900; 235/92 WT; 177/2, 3, 25

[56] References Cited

U.S. PATENT DOCUMENTS

| | | | |
|---|---|---|---|
| 3,170,624 | 2/1965 | Allen | 177/3 |
| 3,290,491 | 12/1966 | Wahlberg | 364/466 |
| 3,692,988 | 9/1972 | Dlugos et al. | 364/466 |
| 3,741,324 | 6/1973 | Boshinski et al. | 177/3 |
| 3,890,492 | 6/1975 | Manduley et al. | 364/466 |
| 4,047,006 | 9/1977 | Ellner | 364/466 |
| 4,093,999 | 6/1978 | Fuller et al. | 364/900 |

OTHER PUBLICATIONS

Nickels; "Computer Change-Back Simplifies Mail Accounting"; Modern Office Procedures; May 1979.

"University Trims its Mailing Costs"; Memo to Mailers -U.S. Postal Service; Aug. 1979.

"Accountability in the Mailroom"; *ZIP*, May 1979.

Orbitran Company, Inc. Advertising Brochure for Parcel Register Computer Model PC-4.

*Primary Examiner*—Errol A. Krass

*Attorney, Agent, or Firm*—Lyon & Lyon

[57] ABSTRACT

A postage cost recording system including a postage computer, a postage meter apparatus for printing postage legends, a meter driver responsive to the postage computer for adjusting the postage amount handles of the postage meter, and a sensor for detecting the passage of items through the postage meter apparatus and for providing a signal to the postage computer. The postage computer stores item records for each metering cycle and for each item sensed by the sensor and controls a printer to provide summaries of the stored item records. Also disclosed are various alternative versions of the postage recording system and letter feed sensors.

16 Claims, 7 Drawing Figures

POSTAGE COST RECORDING SYSTEM

BACKGROUND

Reference is made to co-pending application Ser. No. 125,100, filed concurrently herewith in the names of Danny R. Barger, Carl A. Eggert and Paul O. Lloyd, said application being assigned to the same assignee as the present application, the disclosure of which is incorporated herein by reference.

The present invention relates generally to automated mailing systems and more particularly to postage cost recording systems which may form a part of the automated mailing systems.

Automated mailing systems which may include electric postage scales and postage computers are used to weigh an item and to compute the shipping costs for the items according to such factors as destination and special services or handling that may be desired. Such systems may employ a meter driver responsive to the postage computer to automatically position the postage amount handles of a postage meter. The postage meter is usually removably mounted to a motor-driven base which together with the postage meter prints a postage legend onto the item or prints the postage legend onto a label that is then affixed to the item. The base may also include means for automatically feeding a number of items such as envelopes to the postage meter so that the postage legend may be automatically printed onto each of the items.

With such systems, however, it is desirable to maintain a record of shipping costs. Various devices have been employed for this purpose which attach to the postage amount handles of the postage meter and that sense the mechanical printing function performed by the postage meter to thus provide the postage cost record. Such devices, however, are relatively expensive and substantially increase the overall complexity of the mailing system. Thus, there is a need for a simpler, less expensive means for creating a record of postage costs.

SUMMARY OF THE INVENTION

The postage cost recording system of the present invention eliminates the costly and complex devices which heretofore have been used with the automatic mailing system to provide a suitable postage cost record. Accordingly, the system of the present invention includes a postage computer which controls a meter driver to position the postage amount handles of a postage meter. The postage computer then controls the meter driver to cause, for example, a postage label to be printed and the postage computer stores an item record for the printing operation just performed.

The system further includes a letter feed sensor for detecting the passage of multiple items through the postage meter and the base. The sensor output is applied through the meter driver to the postage computer that in turn stores an item record for each item. The postage computer may then control a printer to generate shipping cost summaries.

It is thus an object of the present invention to provide a postage cost recording system.

It is another object of the present invention to provide a postage cost recording system wherein a postage computer stores item records.

It is a further object of the present invention to provide a postage cost recording system for automated mailing systems.

BRIEF DESCRIPTION OF THE DRAWINGS

The invention, including further objects and advantages thereof, may be better understood by referring to the following detailed description of an embodiment of the invention taken in conjunction with the accompanying drawings in which.

DETAILED DESCRIPTION OF THE INVENTION

Figure 1:
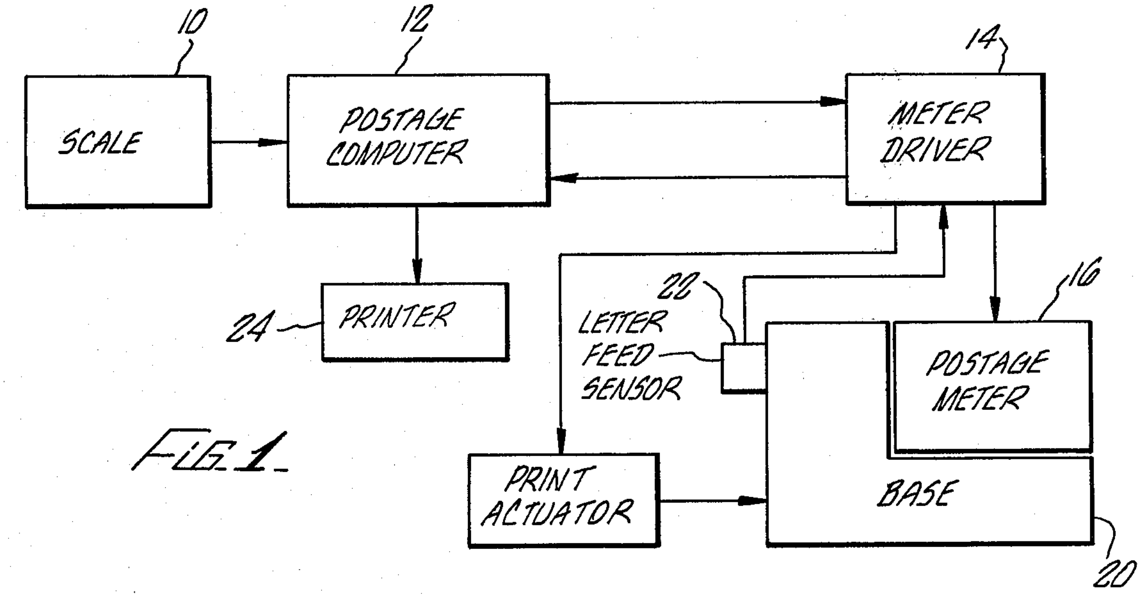
FIG. 1 is a block diagram of a mailing system employing the postage cost recording system of the present invention.

Referring now to FIG. 1, an automated mailing system employing the postage cost recording system of the present invention typically includes an electronic scale 10 onto which various items to be shipped are placed. The scale 10 provides a signal proportional to the weight of the item to a postage computer 12, in response to the signal from the scale 10, and further in response to the various other factors entered by an operator such as, for example, the destination of the item, the shipping class, and any special services that are desired, calculates the shipping cost for the item. This cost may be displayed by the postage computer 12 by means of a conventional digital display.

The postage computer 12 additionally provides drive signals to a meter driver 14 which in turn operates the postage amount handles of a postage meter 16. A suitable meter driver 14, for example, is disclosed in the above-referenced co-pending application Ser. No. 125,100. The postage meter 16 may, for example, be a Pitney-Bowes R series. When the postage computer 12 determines that the postage amount handles are set to the correct shipping costs, the postage computer 12 removes the drive signals from the meter driver 14 and applies a stamp signal to the meter driver 14 which in turn applies a signal to a print actuator 18. The print actuator 18 operates a print lever associated with a base 20. The base 20 typically supports the postage meter 16 and may be one of the Pitney-Bowes 4000 Series such as the Model 4250. The base 20 and the postage meter 16 then cause a postage legend bearing the correct shipping amount to be printed onto a label which is dispensed by the base 20. Once the printing operation is completed, the postage computer 12 may provide reverse drive signals to the meter driver 14 to return the postage amount handles of the postage meter 16 to a home or zero position. The postage computer 12 then stores an item record for the label just printed. Such an item record may include in an exemplary embodiment the postage amount and other information such as department that may be entered by the operator into the postage computer 12.

When a number of items require the same postage amount, the items, such as letters, can be automatically fed through the base 20 and the postage meter 16 so that each item is imprinted with a postage amount legend. A letter feed sensor 22 associated with the base 20 applies a signal through the meter driver 14 to the postage computer 12 in response to the passage of each of the items. The postage computer 12, upon receipt of the signal, stores an item record for each of these items. The item record may be similar to the item records described above.

The postage computer 12 is connected to a printer 24. Periodically, for example, at the end of each business day, the postage computer 12 may be controlled by the operator to provide a postage report summary of the printer 24. This summary may be organized in any suitable fashion according to the accounting requirements of the particular mailing system, such as, by department or by postage class. Thus, by proper use of the various components of an automated mailing system and by the novel inclusion of a letter feed sensor 22 associated with the base 20, the postage cost recording system of the present invention eliminates the previously known costly and complex postage recording devices.

Figure 2:
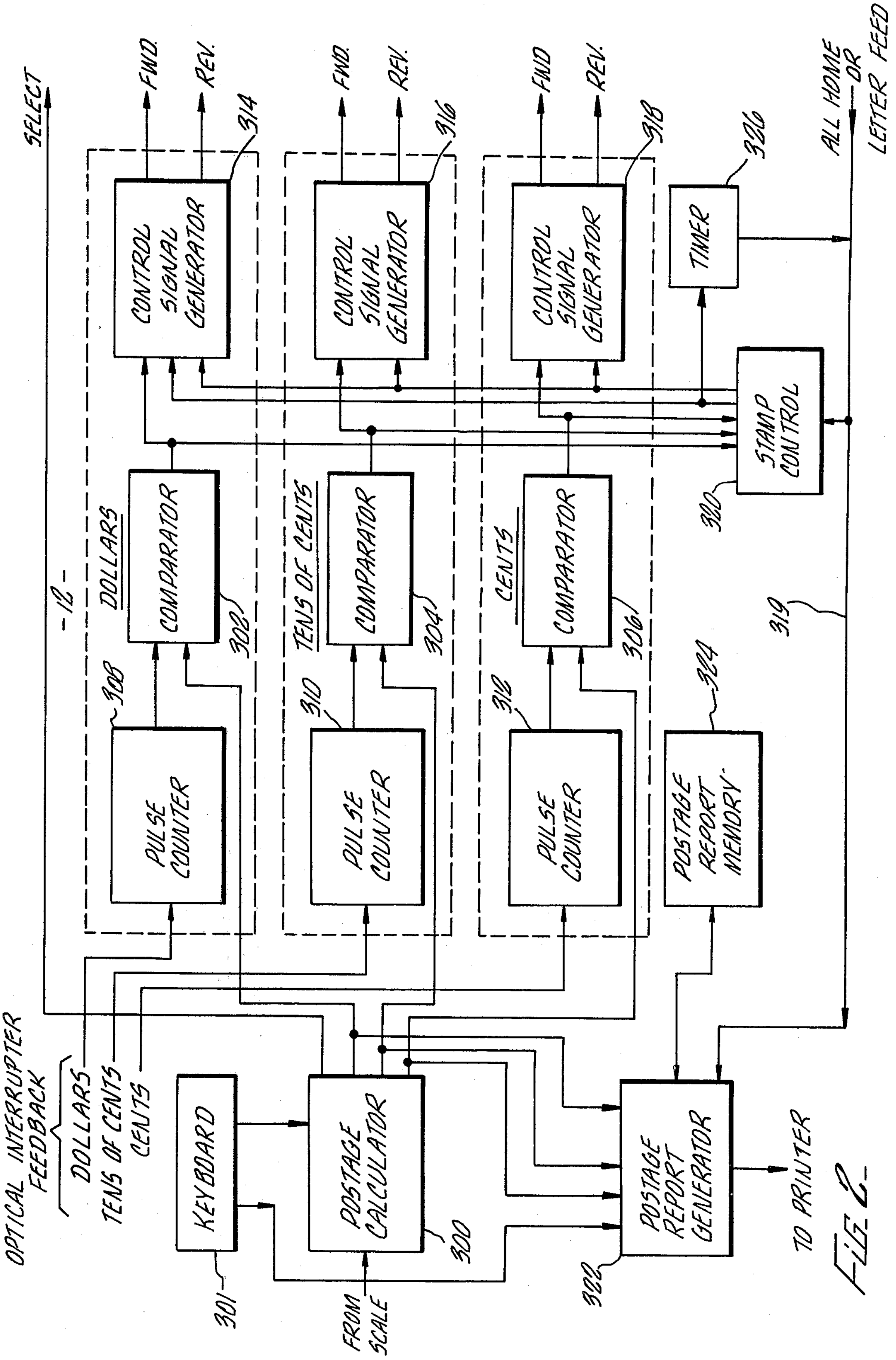
FIG. 2 is a block diagram of various functions performed by the postage computer of FIG. 2.

Turning now to FIG. 2, the postage computer 12 includes a postage calculator 300. The postage calculator 300, as is well known to those skilled in the art, receives a signal from the scale 10 (FIG. 1) and also receives various input information from the operator of the system through a keyboard 301. In an exemplary embodiment, this information from the operator may include the postage class and whether any special service is required such as express mail, special delivery or handling, or return receipt. The postage calculator 300 then computes the shipping costs for the item to be shipped and provides signals proportional to these calculated costs in dollars, tens of cents and cents to three comparators 302, 304 and 306 respectively. These outputs are also applied to a postage report generator 322, the purpose of which is described below.

Figure 3:
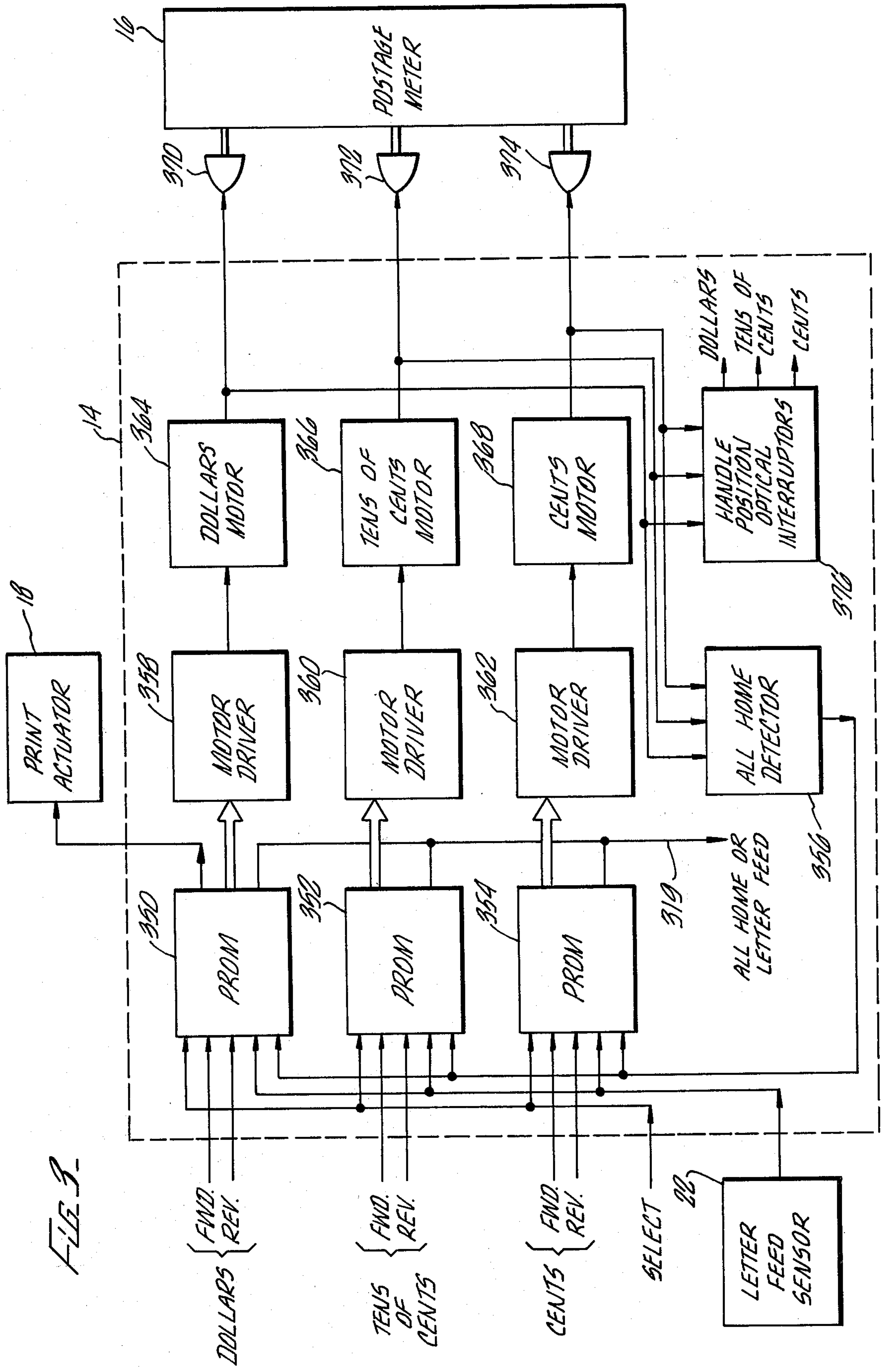
FIG. 3 is a block diagram of the meter driver of FIG. 2.

The postage computer 12 further includes three pulse counters 308, 310 and 312 that provide a second input to the comparators 302–306. When, for example, the dollars comparator 302 detects that the output from the counter 308 is less than the output of the postage calculator 300, the comparator 302 applies a signal to a control signal generator 314 that in turn generates a forward drive signal which is applied to the meter driver 14 (FIG. 3). Similarly, the comparators 304 and 306 provide signals to two control signal generators 316 and 318.

The postage calculator 300 also generates a select signal that allows the postage computer 12 to select between, for example, two meter drivers such as the meter driver 14 and thus allows one of two postage meters to be operated according to the least expensive shipping means available. As a further example, two meter drivers may provide a choice between shipping via United States Postal Service (USPS) or United Parcel Service (UPS).

Figure 5:
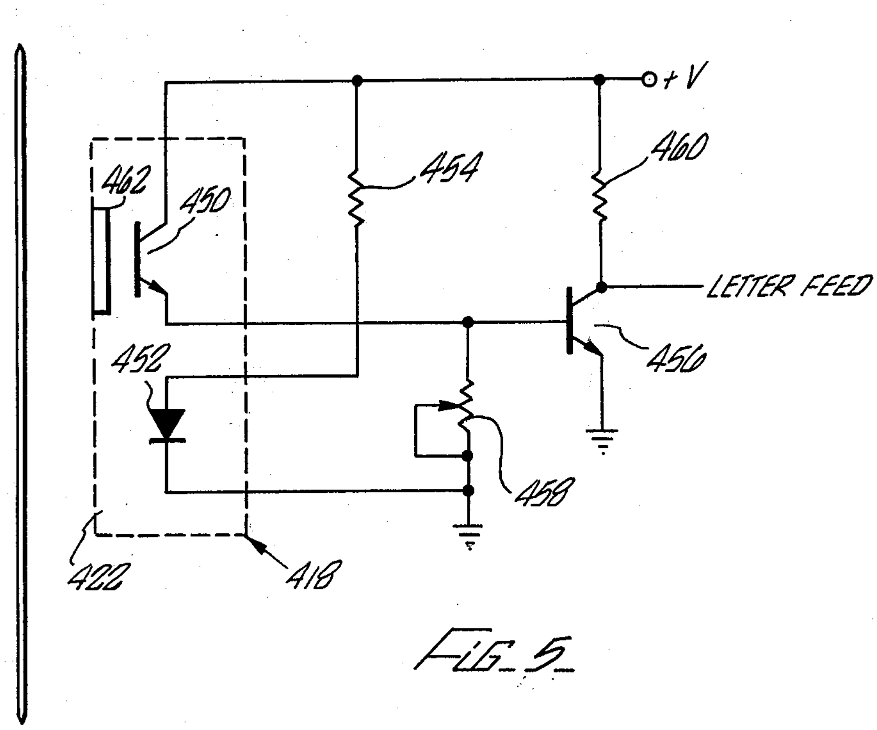
FIG. 5 is a schematic diagram of the letter feed sensor of FIG. 4.
Figure 6:
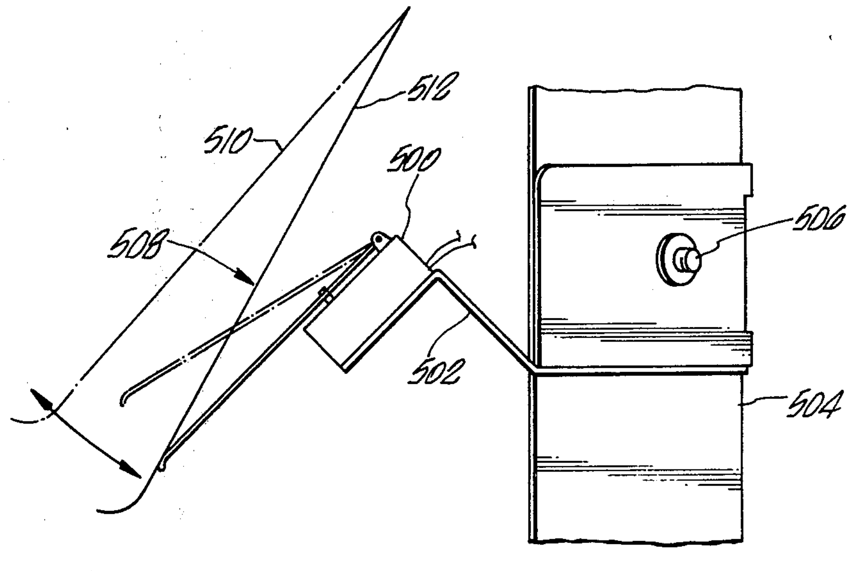
FIG. 6 is another version of a letter feed sensor of FIG. 1.

The select signal from the postage calculator 300 and the drive signals from the control signal generators 314–318 are applied to three programmable read only memories (PROMs) 350, 352 and 354 within the meter driver 14 (FIG. 3). The PROMs 350–354 also receive a signal from the letter feed sensor 22. Suitable letter feed sensors are described below with reference to FIGS. 4–6. An all home detector also applies a signal to the PROMs 350–354. These input signals provide address signals for the PROMs 350–354 and thus for each combination of input signals, the PROMs 350–354 provide unique output signals to three motor drivers 358, 360 and 362. Additionally, an output from each of the PROMs 350–354 is wired together to provide an or function which is then applied through a line 319 as an all home or letter feed signal to the postage computer 12 (FIG. 2).

The motor drivers 358–362 (FIG. 3) generate control voltage signals for a dollars motor 364, a tens of cents motor 366 and a cents motor 368 respectively. The motors 364–368 through suitable drive means position postage amount handles 370, 372 and 374 of the postage meter 16. The position of the handles 370–374 is sensed by handle position optical interrupters 376 that provide dollars, tens of cents and cents feedback signals to the postage computer 12 (FIG. 2).

Returning to FIG. 2, the postage computer 12 also includes a stamp control 320 which receives the output signals from the comparators 302–306. When these outputs indicate that the handles 370–374 of the postage meter 16 (FIG. 3) are properly positioned, that is, when the outputs from the postage calculator 300 equal the outputs from the pulse counters 308–312, the stamp control 320 generates a first signal which is applied to the dollars control signal generator 314. In response to this signal, the generator 314 provides forward and reverse signals to the input of the PROM 350 and the PROM then provides an output which energizes the print actuator 18. At the end of a time period that allows the postage meter 16 and the base 20 to perform the required print operation, the stamp control 320 removes the first signal and provides a second output signal to the control generators 314, 316 and 318 that then apply reverse signals to the respective PROM 350–354.

The stamp control 320 first output signal is also applied to a timer 326. The timer 326 provides a signal on the line 319 after a predetermined period of time has elapsed since the application of the first output signal.

The postage report generator 322, in addition to receiving the signals from the postage calculator 300 as described above, also is responsive to the keyboard 301 and to the signal appearing on the line 319. A postage report memory 324 provides temporary storage for item records generated by the postage report generator 322 as is described below.

The operation of the automatic mailing system of FIG. 1 including the postage cost recording system of the present invention may now be summarized. The postage calculator 300 (FIG. 2) in response to the signal from the scale 10 and from operator inputs from the keyboard 301, calculates the correct shipping cost for the item that is placed on the scale 10 (FIG. 1). These shipping cost signals are applied to the comparators 302–306. Assuming initially that the handles 370–374 (FIG. 3) of the postage meter 16 are at their zero or home position, the pulse counters 308–312 are cleared to a count of zero.

If, for example, the postage calculator 300 indicates that the handle 370 is to be positioned to the digit three, then the comparator 302 controls the control signal generator 314 to apply a forward drive signal to the PROM 350. The PROM 350 in turn controls the motor driver 358 and the dollars motor 364 to move the handle 370 towards the correct position. As the handle 370 is moved, the handle position optical interrupters 376 provide a dollars feedback signal to the pulse counter 308. Once three pulses are counted, indicating that the handle 370 is positioned at the three position on the postage meter 16, the comparator 302 controls the control signal generator 314 to remove the forward drive signal from the PROM 350. The PROM 350 in turn controls the motor driver 358 and thus the motor 364 to cease further movement of the handle 370. The comparators 304 and 306 similarly simultaneously operate the generators 316 and 318, the PROMs 352 and 354, the drivers 360 and 362, and the motors 366 and 368 to position the handles 372 and 374 according to the shipping cost signals provided from the postage calculator 300.

When the comparators 302–306 indicate that the handles 370–374 are properly positioned, the stamp control 320 generates the first output signal that is applied to the generator 314. As described previously, the generator 314 and the PROM 350 provide a signal to operate the print actuator 18. At the end of the time period that allows the postage meter 16 in the base 20 (FIG. 1) to perform the required print operation, the stamp control 320 then provides the second output signal to the control signal generators 314–318 which then apply reverse drive signals to the respective PROMs 350–354. The PROMs 350–354 then control the motor drivers 358–362 and the motors 364–368 to return the handles 370–374 to the zero or home position. Once each handle is so positioned, the all home detector 356 provides a signal through the PROMs 350–364 along the line 319 to the postage computer 12 (FIG. 2). This signal terminates the second output signal from stamp control 320. If the all home detector 356 does not provide an output signal within the period of time determined by the timer 326, then the timer 326 generates its output which is applied to the line 319, removing the second output signal from the stamp control 320.

The postage report generator 322 (FIG. 2) responds to a signal on the line 319 to store an item record into the postage report memory 324. For each signal received on the line 319, the postage report generator 322 creates a record consisting of data fields for, for example, the shipping amount or other dâta from the postage calculator 300 and also various data entered by the operator through the keyboard 301. As will be recognized by those skilled in the art, the particular format of the item record may be easily changed according to the data that is to be recorded. These data may include, for example, the postage class, special services that may be desired, department numbers, invoice numbers, whether the item is COD and the like. Each of the item records is stored into the postage report memory 324 by the postage report generator 322. Thus the postage report memory 324 accumulates item records as the item records are created by the postage report generator 322.

As previously described, the signal on the line 319 may be provided from the meter driver 14 when all of the postage amount handles 370–374 are returned to the zero position at the end of a metering cycle. Thus, for each metering cycle performed by the postage meter 14 in response to the postage calculator 12, an item record is stored by the postage report generator 322 into the postage report memory 324.

The operator through the keyboard 301 (FIG. 2) may command the postage report generator 322 to output a summary of the item records stored in the postage report memory 324. The postage report generator 322, according to the type of summary requested, sorts the item records in the postage report memory 324 and then provides the sorted item records to the printer 24 to create the desired summary. For example, the item records may be sorted by postage class, department, invoice number, or whether COD charges are to be collected. It is to be noted that the type of summaries provided by the postage computer 12 and the printer 24 may be modified by altering the sorting procedure that is used by the postage report generator 322 to sort the item reports stored by the postage report memory 324.

The above described operation performs one metering cycle and records one item record into the postage report memory 324 as would occur, for example, where an item is weighed by the scale 10 (FIG. 1) and the base 20 with the postage meter 16 operate to dispense a single label onto which is printed the required postage legend. Where a plurality of items requiring the same postage amount are to be automatically fed through the base 20 and the postage meter 16, the operator may mannally enter through the keyboard 301 data such as shipping amount or item weight which is applied to the postage calculator 300. The postage computer 12 and the meter driver 14 then operate as previously described to position the postage amount handles 370–374 (FIG. 3) of the postage meter 16 to the required shipping amount. However, the first output signal from the stamp control 320 (FIG. 2) is disabled, and thus the print actuator 18 is disabled. Additionally, the stamp control 320 does not provide the second output signal to the control signal generators 314–318 and consequently the handles 370–374 remain positioned at the required shipping amount.

The plurality of items are then fed through the base 20 and the postage meter 16 and a postage legend is printed onto each item. For each item, the letter feed sensor 22 (FIG. 3) provides a signal to the PROMs 350–354. The PROMs 350–354 thereupon provide an output signal on the line 319 to the postage computer 12 (FIG. 2).

As previously described, the postage report generator 322 stores an item record into the postage report memory 324 for each signal appearing on the line 319. It is therefore seen that, for each item automatically fed through the base 20 and the postage meter 16, the letter feed sensor 22 causes the postage report generator 322 to store an item record into the postage report memory 324. These item records insure that the shipping costs for all of the items automatically imprinted with the postage legend are accurately stored and may then form a part of a postage cost summaries as described above.

It is to be understood that the postage cost recording system of the present invention need not be implemented using the meter driver 14 of FIG. 1. For example, the postage computer 12 can be used to calculate shipping costs which are then manually transferred to the postage amount handles 370–374 of the postage meter 16. The operator then enters through the keyboard 301 instructions which cause the postage report generator 322 to store an item record into the postage report memory 324. Additionally, the letter feed sensor 22 of FIG. 1 provides its signal directly to the line 319 of the postage computer 12 (FIG. 2). This signal then operates the postage report generator 322 as described above to store an item record for each item which is automatically fed through the base 20 and the postage meter 16.

Although the postage computer 12 and the meter driver 14 (FIG. 1) have been described as returning the postage amount handles 370–374 after the metering operation is performed for a single item, it is to be noted that the handles 370–374 may alternately remain at the last postage amount position and be moved to the next postage amount position without first returning to zero. As will be recognized by those skilled in the art, the comparators 302–306 then compare the signals from the postage calculator with the present count of the pulse counters 308–312 which are operated as up-down counters. The comparators 302–306 operate the control signal generators 314–318 to provide forward or reverse drive signals to the PROM 350–354 to thereby position the handles 370–374 as required and to decrease the difference between the output from the postage calculator 300 and the pulse counters 308–312. Once these signals are equal, further displacement of the handles 370–374 ceases. The stamp control 320 generates the second output signal as described above only when it may be necessary to reset the postage amount handles 370–374 to the zero position. The timer 326 provides a signal to the postage report generator 322 as described above.

The timing of the item report generation by the postage report generator 322 is not critical but need only be performed once the shipping costs have been calculated and once the other data is available. Although this timing has been described herein as being in response to the all home signal, the letter feed signal or the signal from the timer 326, it is to be recognized that the report generation may occur at other suitable times, such as simultaneously with the displacement of the handles 370–374 to thus reduce the time required for a complete cycle.

The functions of the postage computer 12 described with respect to FIG. 2 may be implemented by a means of a microcomputer system including a suitable microprocessor such as an F8. An exemplary program for such a micro processor is attached hereto as Exhibit A.

Figure 4:
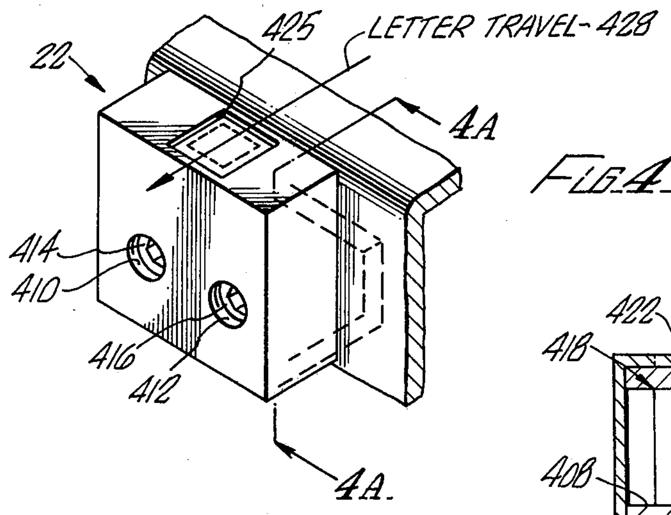
FIG. 4 is a version of a letter feed sensor of FIG. 1.
Figure 4A:
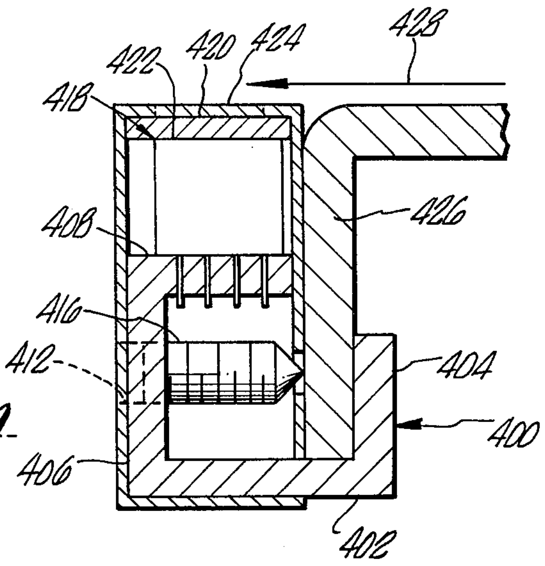
FIG. 4A is a generally cross-sectional view of the letter feed sensor of FIG. 4 taken substantially along line 4A.

Turning now to FIG. 4, a suitable letter feed sensor 22 may include a steel hanger brackete 400 having a base portion 402, a vertical stop portion 404, a vertical support portion 406 disposed generally parallel to the stop portion 404, and a horizontal plate 408 generally parallel to the horizontal base portion 402. Two openings 410 and 412 are threaded horizontally through the vertical support portion 406 and two cone point set screws 414 and 416 are disposed therein. An optoelectronic emitter/sensor assembly 418 is affixed vertically to the upper surface of the horizontal plate 408. A protective glass plate 420 is disposed across an optical sensing surface 422 of the assembly 418 and cover 424 encloses the letter feed sensor 22. The cover 424 includes an opening 425 formed above the optical sensing surface 422 of the assembly 418.

The letter feed sensor 22 of FIG. 4 may be affixed to a lip 426 of the base 20 by tightening the set screws 414 and 416 to engage the lip 426 and to thus clamp the lip 426 between the points of the set screws 414 and 416 and the vertical stop portion 404. The lip portion 424 of the base 20 is disposed beneath the path 428 of items that are fed through the base 20 and the postage meter 16.

The emitter/sensor assembly 418 includes a photo transistor 450 (FIG. 5) and a light emitting diode (LED) 452. A suitable assembly 418 may be, for example, a Fairchild type No. FPA 108. The anode of the LED 452 is connected through a resistor 454 to a suitable voltage supply +V. The cathode of the LED is connected to ground, thus illuminating the LED 452. The collector of the transistor 450 is also connected to +V and the emitter of the transistor 450 is connected to the base of a transistor 456 and is also connected through a potentiometer 458 to ground. The collector of the transistor 456 is connected through a resistor 460 to +V and the emitter of the transistor 456 is connected to ground. Thus the transistor 456 forms an inverting amplifier responsive to the photo transistor 450. A letter feed output signal is taken from the junction of the collector of the transistor 456 with the resistor 460.

With the letter feed sensor 22 of FIG. 4 in place and as items are fed through the base 20 and the postage meter 16, the light emitted by the LED 452 through the optical sensing surface 422 of the assembly 418 is reflected by each item back through the surface 422 and through an ultra violet light filter 462 to the photo sensitive surface of the transistor 450. Thus, when an item passes across the opening 425, the light reflected by the item from the LED 452 to the photo transistor 450 causes the transistor 450 to conduct and also causes the transistor 456 to conduct, thus providing a low-level signal at the letter feed output. This output is applied to the PROMs 350–354 (FIG. 2) as described with reference to that figure. Alternatively, if a meter driver is not used with the postage cost recording system of the present invention, the letter feed output can be applied to the line 319 and hence to the postage report generator 322.

Another version of the letter feed sensor 22 (FIG. 6) includes a lever switch 500 affixed to a bracket 502 which is in turn affixed to a bracket 504 within the base 20 by means of a threaded fastener 506. The switch 500 is positioned by the bracket 502 to sense the relative position of a letter feed lever 508 within the base 20. As items are fed through the base 20 and the postage meter 16, the lever 508 cycles from an inactive position 510 to an active position 512 and actuates the lever switch 500. When thus actuated, the switch 500 generates a low-level letter feed signal that can be used as described above.

It is to be recognized that other suitable letter feed sensors 22 (FIG. 1) may be employed to detect the passage of items through the base 20 and the postage meter 16 as by, for example, detecting the increase in motor current within the base 20 corresponding to the item feed cycle.

While an exemplary embodiment of the invention has been described, it is to be understood that the invention is not limited to the details herein explained. It is expected that those skilled in the art will recognize numerous variations and equivalents which come within the spirit of the invention and which are intended to be included herein.

What is claimed is:

1. A cost recording system for use with a metering apparatus wherein the metering apparatus includes means for feeding a plurality of items through the apparatus and printing means for printing cost indicia onto the items, the cost recording system comprising item feed sensor means for providing an output in response to the passage of each item of the plurality of items through the metering apparatus, and computing means including means for calculating the amount of the cost indicia, means responsive at least to the indicia calculating means for generating an item record in response to the item feed sensor means output, the item record including at least the amount of the cost indicia, means responsive to the record generating means for storing the item record, and means for providing an output of the stored item record.

2. A system as in claim 1 wherein the system further includes means responsive to the output from the stored item record output means for providing a printed record of the stored item records.

3. A system as in claim 1 wherein the printing means is a postage meter and the cost indicia is postage costs.

4. A system as in claim 3 wherein the postage meter has adjustable input means indicative of cost indicia to be printed by the postage meter and the system further includes drive means responsive to the computing means for adjusting the adjustable input means according to the amount calculated by the cost indicia calculating means.

5. A cost recording system for use with a metering apparatus wherein the apparatus includes means for feeding a plurality of items through the apparatus and a cost meter for printing cost indicia, the meter having adjustable input means indicative of cost amounts to be printed by the cost meter, comprising item feed sensor means for providing an output in response to the passage of each item of the plurality of items through the apparatus, computing means including means for calculating the cost amount to be printed by the cost meter, means responsive at least to the cost calculating means for generating an item record in response to the item feed sensor means output, the item record including at least the cost amount, means responsive to the record generating means for storing the item record, and means for providing an output of the stored item record, and drive means responsive to the computing means for adjusting the adjustable input means.

6. A postage cost recording system for use with a postage metering apparatus wherein the apparatus includes means for feeding a plurality of items through the apparatus to receive a printed postage amount legend, comprising item feed sensor means for providing an output in response to the passage of each item of the plurality of items through the postage metering apparatus, and postage computing means including calculating means for calculating postage costs, means responsive to at least the calculating means for generating an item record in response to the item feed sensor means output, the item record including at least postage costs, means responsive to the record generating means for storing the item record, and means for providing an output of the stored item record.

7. A system as in claim 6 or in the system further includes printer means responsive to the stored item record output means for providing a printed record of the stored item records.

8. A system as in claim 6 wherein the means for feeding a plurality of items through the apparatus to receive a printed postage amount legend includes a postage meter having adjustable input means indicative of postage amount to be printed by the postage meter and the system further includes drive means responsive to the postage computing means for adjusting the adjustable input means according to the cost calculated by the calculating means.

9. A postage cost recording system for use with a postage metering apparatus wherein the apparatus includes means for feeding a plurality of items through the apparatus and a postage meter for printing a postage amount legend, the meter having a plurality of adjustable postage amount handles, the position of which controls the postage amount legend to be printed by the postage meter, comprising item feed sensor means for providing an output in response to the passage of each item of the plurality of items through the postage metering apparatus, postage computing means including means for calculating postage amount, means responsive at least to the means for calculating postage amount for generating an item record at least in response to the item feed sensor means output, the item record including at least postage amount, means responsive to the record generating means for storing the item record, and means for providing an output for the stored item record, a meter driver responsive to the postage computing means for positioning the postage amount handles according to the postage amount calculated, and printer means responsive to the stored item record output means for providing a printed record of one or more stored item records.

10. A system as in claim 9 wherein said postage computing means further includes keyboard means for the manual entry of data and the record generating means is further responsive to the keyboard for including within the item record at least a portion of the manually entered data.

11. A system as in claim 9 wherein said item feed sensor means includes optical sensing means for detecting the items fed through the apparatus.

12. A cost recording system as in claim 9 wherein the item feed sensor means includes switch means responsive to the apparatus feeding means for detecting items fed through the apparatus.

13. A postage cost recording system for use with a postage metering apparatus wherein the apparatus includes means for feeding a plurality of items through the apparatus and a postage meter for printing a postage amount legend, the meter having a plurality of adjustable postage amount handles, the position of which controls the postage amount legend to be printed by the postage meter, comprising item feed sensor means for providing an output in response to the passage of each item of the plurality of items through the postage metering apparatus, storage computing means including means for calculating postage amount, keyboard means for the manual entry of data including a predetermined postage amount, means responsive at least to the postage cost calculating means or to the keyboard means for generating an item record at least in response to the item feed sensor means output, the item record including at least postage amount, means responsive to the record generating means for storing the item record, and means for providing an output of the stored item record, a meter driver responsive to the postage computing means or to the keyboard means for positioning the postage amount handles in accordance with the postage amount, and printing means responsive to the stored item record output means for providing a printed record of one or more stored item records.

14. A system as in claim 13 wherein said item feed sensor means includes optical sensing means for detecting the items fed through the apparatus.

15. A system as in claim 13 wherein the item feed sensor means includes switch means responsive to the apparatus feeding means for detecting the items fed through the apparatus.

16. A postage cost recording system for computing and accumulating postage costs comprising a postage meter including means for printing a postage legend including postage amount, the meter having a plurality of postage amount handles which control the postage amount legend printed by the postage meter, a postage meter base that receives and supports the postage meter and which activates the postage meter to print the postage legend, the postage meter base including means for automatically feeding a plurality of items therethrough for being printed with the postage amount legend, item feed sensor means for mounting in association with the postage meter base and for providing an output in response to the passage of each item of the plurality of items through the postage meter base, scale means for weighing an item and for providing an output proportional to the item weight, postage computing means including means responsive to said scale means output for calculating postage amount, keyboard means for the manual entry of data including a predetermined postage amount, means responsive at least to the means for calculating postage amount or to the keyboard means for generating an item record in response to the item feed sensor means output, the item record including at least postage amount, means responsive to the record generating means for storing the item record, and means for providing an output of the stored item record, a meter driver responsive to the postage computing means including means for positioning the postage amount handles in accordance with postage amount and actuator means for actuating the postage meter base to print the postage legend, and printing means responsive to the stored item record output means for providing a printed record of one or more stored item records.

* * * * *

UNITED STATES PATENT AND TRADEMARK OFFICE

CERTIFICATE OF CORRECTION

PATENT NO. : 4,319,328

DATED : March 9, 1982

INVENTOR(S) : CARL A. EGGERT

It is certified that error appears in the above—identified patent and that said Letters Patent is hereby corrected as shown below:

Change on the cover sheet the column marked [73] assignee from "Sabre Products, Inc., North Hollywood, Calif." to Bell & Howell Company, Chicago, Illinois.

Signed and Sealed this

*Tenth* Day of *August 1982*

[SEAL]

*Attest:*

GERALD J. MOSSINGHOFF

*Attesting Officer* *Commissioner of Patents and Trademarks*